Sept. 5, 1961 V. L. CARISSIMI 2,999,144
CONTROL DEVICE
Filed Dec. 14, 1956

WITNESSES
Edwin E. Bassler
Leon M. Garman

INVENTOR
Vincent L. Carissimi
BY
Arthur T. Stratton
ATTORNEY

United States Patent Office 2,999,144
Patented Sept. 5, 1961

2,999,144
CONTROL DEVICE
Vincent L. Carissimi, Fairfield, Conn., assignor to Westinghouse Electric Corporation, East Pittsburgh, Pa., a corporation of Pennsylvania
Filed Dec. 14, 1956, Ser. No. 628,384
12 Claims. (Cl. 219—20)

My invention relates to a device for controlling an electrical circuit and more particularly to a device for controlling the electrical energization of an electrical heating unit in an electric range.

In the art of cooking, the particular temperature at which a food or mixture should be cooked varies due to the variations of the content of the various foods and mixtures. For a particular food or mixture, however, there is a particular optimum temperature range at which the cooking process should be performed. Obviously, therefore, the heat output of a heating unit, such as an electrical heating unit, must be variable in order to obtain the various particularly desired temperatures. In addition, it is desirable that the desired temperature be achieved as rapidly as possible, and thereafter only sufficient heat be supplied to miantain the food or mixture at the desired temperature without the necessity of manual adjustment of the heat output of the heating unit.

Heretofore, various controls for such purposes have been developed which have not been entirely satisfactory due to their expensive components and the consequent difficulties encountered in calibration for proper operation. Other prior devices of simplified construction have not been satisfactory as they have not given consistent operation due to various reasons, such as contact wear, high current requirements or ambient temperature effects.

Accordingly, one object of my invention is to provide a new, improved and simplified control device for accurately varying the heat output of a heating means.

Another object of my invention is to provide a new and improved control device comprising a pair of adjacent cooperable bimetals which are movable independently of each other.

A more specific object of my invention is to provide a new and improved control device comprising a pair of adjacent cooperable bimetals, each of which is thermally connected to the same heat source and one of which is provided with means for causing additional movement thereof.

Another more specific object of my invention is to provide a new and improved control device comprising a pair of adjacent cooperable bimetals, one of which is thermally secured to a heat source and the other of which is mechanically secured to the heat source but is thermally insulated therefrom.

Still another particular object of my invention is to provide a new and improved control device comprising a pair of adjacent elongated cooperable bimetals which have different deflections for the same temperature use.

These and other objects of my invention will become more apparent upon the consideration of the following detailed description of preferred embodiments thereof, when taken in conjunction with the attached drawings in which.

Figure 1:
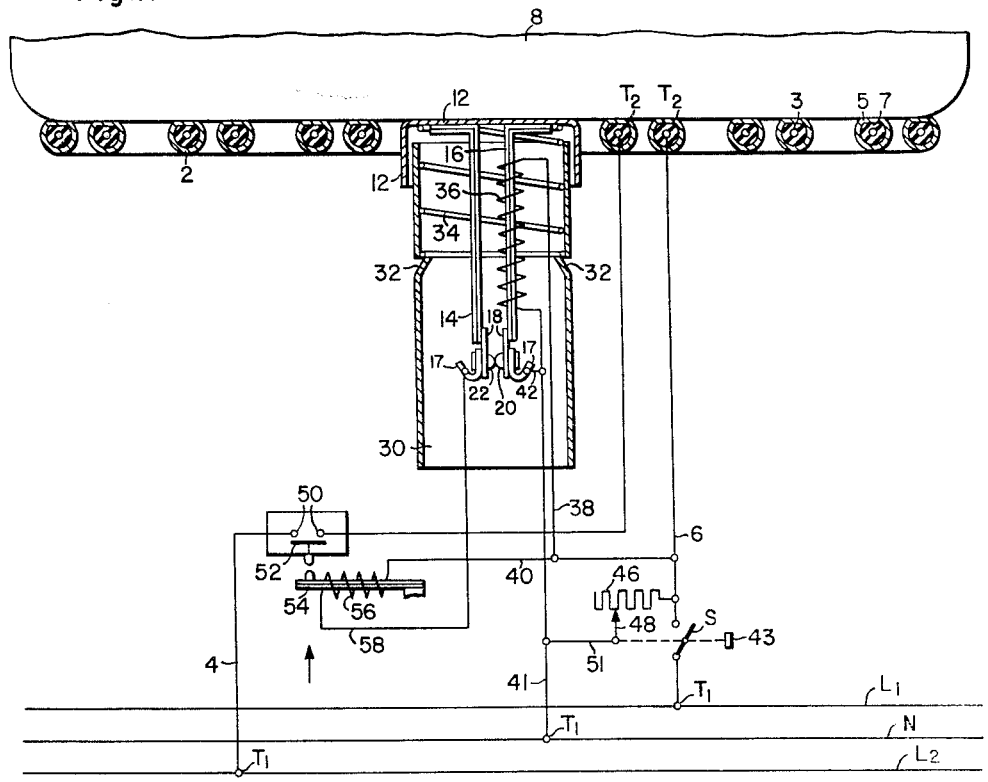
FIGURE 1 is a cross sectional view of a heating element having a control device constructed in accordance with the principles of my invention located therein and the electrical control circuit thereof.

The use of electrical resistance heating elements, and particularly those for electrical ranges for which my control is ideally suited, are well known in the art, and accordingly, their construction and operation need not be described in detail. In the drawing, an electrical heating element 2 is shown, which generally includes a resistance wire 3 enclosed in a metal sheath 5 with an insulation filling 7. The wire 3 has its opposite ends electrically connected by means of suitable electrical conductors 4 and 6 to suitable electrical supply conductors $L_2$ and $L_1$, respectively. As is customary, suitable terminals $T_1$ and $T_2$ are provided for securing conductors 4 and 6 to the conductors $L_1$ and $L_2$ and the heating element 2, respectively. It is to be realized that the particular showing of the heating element 2 is merely representative of one of the various types of standard heating elements commercially available and that my invention may be utilized with any of such heating elements at any desired operating voltage. A three-line supply system is commonly employed for such heating elements and; accordingly, the conductors $L_1$ and $L_2$ are shown with a third grounded neutral conductor N as an electrical supply.

As also shown, the heating element 2 is arranged in a flat coil to support a cooking vessel 8 on its upper surface, and to provide a central opening in which a control unit constructed in accordance with the principles of my invention is located. Although not shown, the heating element 2 may be stationarily supported by suitable means, such as the frame of an electric range in a well-known manner. Further, it is to be realized that water is the common cooking fluid employed and that at standard atmospheric conditions, the boling temperature of water is 212° F. The boiling point of water varies with variations in atmospheric conditions so that it is necessary for a range manufacturer to supply a control unit which will function under all normally encountered atmospheric conditions.

As shown, the control device comprises an inverted cup-shaped sensor plate 12, the upper surface of which is biased into engagement with the bottom of the vessel 8 as hereinafter described. The sensor plate 12 is preferably formed from a heat conducting, high creep strength material, such as stainless steel, which is resistant to the corrosive effects of food spillage which may occur during the cooking process. A generally L-shaped sensor bimetal 14 is located to one side of the underside of the sensor plate 12 with its shorter leg being secured to the undersurface thereof in any suitable manner, such as by being resistance-welded or brazed thereto.

An L-shaped control bimetal 16 is also secured to the underside of the sensor plate 12 in the same manner as the bimetal 14 so that the free ends of the bimetals 14 and 16 are spaced apart from each other below the sensor plate 12. The bimetals 14 and 16 are constructed of laminations of any suitable pair of dissimilar materials having different coefficients of expansion as is well-known in the art. As will become more apparent hereinafter, both the sensor bimetal 14 and the control bimetal 16 are designed so that upon heating their free ends move in the same direction which, with respect to FIG. 1 of the drawing, is clockwise. In addition the control bimetal 16 is preferably constructed so as to have a smaller deflection per degree rise in temperature than the sensor bimetal 14. Such smaller deflection can readily be obtained in various ways, such as by utilizing the same bimetal material for each of the bimetals 14 and 16 and providing the bimetal 16 with a heavier section than the sensor bimetal 14 or by utilizing a different type of bimetal material for the bimetal 16 which has a characteristic deflection which is less than the bimetal material from which the bimetal 14 is constructed for the same temperature rise.

For purposes more fully described hereinafter electrical insulating supports 18 are secured to the free ends of each of the bimetals 14 and 16, respectively, which may be secured to the adjacent sides of the bimetals 14 and 16 in any suitable manner, such as being riveted thereto. As shown, the supports 18 extend downwardly from the free end of the bimetals 14 and 16, however, if desired the supports 18 may be located upwardly on their supporting bimetal or in any intermediate location. The support 18 secured to the bimetal 16 is provided with a suitable contact 20 which is secured thereto in any suitable manner such as being riveted thereto, so that the contact 20 extends toward the support 18 secured to the bimetal 14. Similarly the support 18 secured to the bimetal 16 is provided with a suitable contact 22 which extends toward and is engageable with the contact 20, as hereinafter described. The contacts 20 and 22 may be formed from any suitable arc-resistant contact material, such as silver or an alloy thereof. In order to facilitate making electrical connections to the contacts 20 and 22 suitable electrical conducting terminals 17 may be provided on the outwardly facing side of the supports 18 and which may be secured to the contacts 20 and 22 by the rivets used to secure the contacts 20 and 22 in place. Such terminals 17 are well known in the art, and the particular construction shown is merely illustrative of one manner of accomplishing the described purpose. It will be noted that the supports 18 electrically insulate the bimetals 14 and 16 from their respective contacts 20 and 22 and, accordingly, the supports 18 are formed from any suitable electrical insulating material, such as a cured thermoset elastomeric silicone resin which retains its rigidity and insulating properties at the elevated operating temperatures of my device.

In order to obtain proper contact of the sensor plate 12 with the underside of the vessel 8 and to prevent the aforedescribed assembly from being fouled due to spillage, a cylindrical shield 30 is provided which is rigidly mounted, for example to the above-mentioned range frame, not shown, on which the heating element 2 is mounted to also be supported thereby. The shield 30 is formed preferably from a suitable corrosion-resistant material, such as stainless steel or aluminum, and is located so as to receive the bimetals 14 and 16, with its upper edge being located closely adjacent the underside of the sensor plate 12 and with its lower edge being spaced below the supports 18. The shield 30 is provided with inwardly extending supporting lugs 32 spaced around its periphery for supporting the bottom coil of a coiled compression biasing spring 34 on their upper edge. The spring 34 is formed of any suitable spring material which does not lose its resiliency at elevated temperatures, such as stainless steel, so that it is capable of withstanding the induced thermal stresses produced by the alternate heating and cooling of my device, and is also resistant to corrosion. The upper coil of spring 34 engages the undersurface of the sensor plate 12 so as to bias the upper surface of the sensor plate 12, upwardly into engagement with the lower surface of the vessel 8. As can be appreciated, such positive engagement between the vessel 8 and the upper surface of the sensor plate 12 is desirable to insure good thermal transfer from the vessel 8 to the sensor plate 12. In view of the fact that the bimetals 14 and 16 are rigidly secured to the sensor plate 12, it is obvious that they will be moved with the sensor plate 12.

In order to obtain selective control of the operation of the control bimetal 16, a heater coil 36 of any suitable electrical resistance material is wound about and insulated from the bimetal 16 in any well-known manner, such as by providing a jacket of insulating material on the bimetal 16. The heater coil 36 has one of its ends electrically connected by means of a suitable conductor 38 to conductor 40 having one of its ends connected to the conductor 6. The other end of the heater coil 36 is electrically connected by a suitable electrical conductor 41 to the supply conductor N. Again a suitable terminal $T_1$ may be employed for such purposes. As shown, the electrical conductor 41 is also electrically connected to the contact 20 through its terminal 17, by means of a suitable conductor 42.

It will be noted that the heater coil 36 is thus connected between the supply conductors $L_1$ and N so as to be operative regardless of the energization of the heater coil 2. In order to vary the electrical input to the heater coil 36, a resistor 46 is connected to the conductor 6 between the conductor $L_1$ and 40, and an adjustable tap 48 is electrically connected to the conductor 41 by means of a suitable electrical conductor 51. The tap 48 adjustably engages the resistor 46 so as to provide, in conjunction with the resistor 46, a variable resistor or rheostat in parallel with the heater coil 36. It is also desirable that the conductor 6 be provided with an "on-off" switch so that at least one side of the heater coil 2 may be disconnected from the supply source. Accordingly, a switch S having separable contacts connected in the conductor 6 is provided which is located between the resistor 46 and the line $L_1$. Switch S may be of any conventional type; however, in order to eliminate duplication of manual controls, switch S and rheostats 46, 48 are operable by the same handle 43. Switch S has "on" and "off" positions and is of a type which has additional movement at its "on" position to obtain adjustment of the tap 48 across the resistor 46. With such a construction and by placing a suitably marked identification plate in juxtaposition with handle 43 of the switch S, the handle 43 may be moved to a given "on" position to both electrically connect the heater 36 across the lines $L_1$ and N, and to also move the adjustable tap 48 to the desired operating position with respect to the resistor 46.

As also shown, conductor 4 is provided with a pair of spaced contacts 50, similar to contacts 20 and 22, which are adapted to be electrically bridged by means of a movable contact 52. The operation of the movable contact 52 is obtained by means of a bimetal 54 which is similar in construction to the bimetals 14 and 16, previously described, and around which a heater coil 56 is disposed similar to the heater coil 36, and in the same manner. One end of the bimetal 54 is secured by any suitable means to the aforementioned supporting frame, and its other end is movable into engagement with the movable contact 52 to cause the movable contact 52 to bridge the contacts 50 when the bimetal 54 is heated. Accordingly, the low expansion side of bimetal 54 is located so as to face the movable contact 52. One end of the heater coil 56 is electrically connected to the contact 22 by means of a suitable electrical conductor 58 connected to the terminal 17 connected to the contact 22, and the other end thereof is electrically connected to the conductor 40.

The system, as shown, is in the normal "off" condition, with switch S open and contacts 50 disconnected from each other. In this position, it will be noted that the contact 20 engages the contact 22. By placing the vessel 8 upon the heating coil 2, the sensor plate 12 is depressed but this does not have any effect upon the engagement of the contacts 20 and 22. By moving the handle 43 of the switch S to an "on" position, the heater coil 36 is directly connected across supply lines N and $L_1$ by means of the circuit comprising conductor 41, heater coil 36 and the conductors 38, 40 and 6. Current will immediately flow causing heating of the heater coil 36. The magnitude of such current flow will be dependent, however, upon the position of the variable resistor 48—46 connected in parallel with the heater coil 36.

At the same time, switch S is closed; it will be noted that the heater coil 56 is directly connected across supply lines $L_1$ and N by means of connected conductors 6 and 40; and conductor 58, engaged contacts 20—22, and conductor 41. Current will also flow through the heater coil 56, and the bimetal 54 will deflect to cause its free end to engage the contact 52 and move the contact 52 into bridging relationship with the spaced contacts 50 whereby the heater coil 2 will be connected across the supply lines $L_1$ and $L_2$ by means of the circuit comprising conductor 4, having electrically bridged contacts 50 therein, and conductor 6, having the closed switch S therein. As soon as heating of the heating element 2 occurs, heat will be transmitted to the vessel 8 and its contents which, in turn, will cause heat to be transmitted to the sensor plate 12 and the bimetals 14 and 16 secured thereto.

As the sensor plate 12 is in good thermal contact with the vessel 8, the vessel 8 and the sensor plate 12 will be at substantially the same temperature. As each of the bimetals 14 and 16 are thermally secured to the sensor plate 12, heating of the sensor plate 12 will cause the bimetals 14 and 16 to be heated and due to the characteristics of the bimetal material cause the lower ends of the bimetals 14 and 16 to move. As indicated, the free end of the bimetals 14 and 16 move clockwise with reference to FIG. 1 when heated. It can readily be appreciated that the total movement of the free end of the bimetals 14 and 16 when heated is dependent upon the temperature of the sensor plate 12; however, as the sensor plate 12 is at substantially the same temperature as the vessel 8 such movement of the bimetals 14 and 16 is actually directly proportional to the temperature of the vessel 8 and its contents. As the temperature of the vessel 8 increases the free ends of the bimetals 14 and 16 will move further in a clockwise direction.

In view of the fact that the control bimetal 16 has a smaller displacement per degree rise in temperature than the sensor bimetal 14 and the fact that both bimetals 14 and 16 are connected to the same heat source, that is the sensor plate 12, so that the bimetals 14 and 16 are at substantially the same temperature, the sensor bimetal 14 will move a greater distance clockwise than the control bimetal 16. Such greater deflection of the sensor bimetal 14 will cause the contacts 20 and 22 to have a normal breaking point due to the fact that the positions of the contacts 20 and 22 are determined by the positions of the bimetals 16 and 14, respectively. Upon separation of the contacts 20 and 22, the electrical heating unit 2 will be electrically disconnected from its supply line $L_1$ and $L_2$, as the energizing circuit for the heater coil 56 for holding the contacts 50 in bridged relationship is energized through the contacts 20 and 22 as previously described.

Upon deenergization of the heating unit 2 the reverse thermal sequence will occur. Thus, heating element 2 will cool which in turn will cause the vessel 8, the sensor plate 12 and the bimetals 14 and 16 to cool. During the cooling process the free ends of the bimetals 14 and 16 will move counterclockwise with reference to FIG. 1. Again, due to the thermal characteristics of the bimetals 14 and 16, the free end of the bimetal 14 will move a greater counterclockwise distance per degree change in temperature than the free end of the bimetal 16 for the same change in temperature. As before, since the bimetals 14 and 16 are thermally connected to the same heat source, the sensor plate 12, the cooling rate of each of the bimetals 14 and 16 will be equal. Accordingly, upon sufficient cooling the contents 20 and 22 will reengage as they are mechanically connected to the free ends of the bimetals 14 and 16. Upon reengagement of the contacts 20 and 22 the heater coil 56 will again be electrically energized as previously indicated so that the entire cycle is repeated.

As indicated, the closing of the switch S connects the heater coil 36 to the supply conductors $L_1$ and N so that it is energized at all times during the period the switch S is closed. For the purpose of better understanding of my invention the effect of the heater coil 36 alone will be described as though the sensor plate 12 remained at room temperature. Under these circumstances the heating effect of the heater 36 constantly urges the free end of the bimetal 16 clockwise with reference to FIG. 2. Accordingly, due to the fact that contacts 20 and 22 are initially engaged, the clockwise movement of the control bimetal 16 causes a corresponding clockwise movement of the sensor bimetal 14.

Such movement, however, is opposed by sensor bimetal 14, and while certain movement of the latter may occur, some forces will be generated within the two bimetals as a result of heating the control bimetal 16 by its heater 36. The heating effect of the heater coil 36 can quickly and easily be varied by merely varying the magnitude of the resistance 46 in parallel with the heating coil 36 by moving the tap 48. The particular electrical control circuit for the rheostat 46—48 shown is merely one of various suitable controls which may be employed for infinitely varying, within limits, the heating effect of the heating coil 36. For a more particular description of this and other suitable controls for my purpose, reference is made herein to my copending application Serial No. 628,383, filed concurrently herewith, entitled Wiring Device, which has been assigned to the same assignee as this invention. Inasmuch as the heat output of the heater coil 36 may be infinitely varied within limits, the clockwise deflection of the control bimetal 16 and forces built up in the two bimetals may be infinitely varied from its normal cold position to its extreme clockwise position corresponding to the full heat output of the heating coil 36.

Now considering the effects of heating the control bimetal 16 by both the heater coil 36 and the sensor plate 12 it will be obvious that the control bimetal 16 will be moved a greater clockwise distance when heated by the heater coil 36 and the sensor plate 12 than in the previously described instance where the control bimetal 16 is heated by the sensor plate 12 only. Such greater clockwise movement of the bimetal 16 will therefore overcome the effect of the smaller characteristic deflection of the control bimetal 16 so that the point at which breaking of the contacts 20 and 22 will occur will be moved clockwise an amount depending upon the heat output of the heating coil 36. Since the breaking point of the contacts 20 and 22 is displaced clockwise, a greater temperature must be achieved by the sensor bimetal 14, in order to obtain movement of the contact 22 away from and out of engagement with the contact 20, than in the case where no heat is supplied to the bimetal 16 by the heating coil 36. Thus, the vessel 8 temperature must necessarily be higher to achieve the higher sensor bimetal 14 temperatures.

For example, assuming a normal breaking point of the contacts 20, 22, a bimetal temperature of 80° F., then if sensor plate 12 is at a temperature of 100° F., the free ends of the sensor bimetal 14 and the control bimetal 16 would be moved clockwise by the effect of heat transfer from the sensor plate 12 to one particular position at which, due to such heat transfer alone, the contacts 20 and 22 would be separated by a large amount. By turning switch S to a 100° F. position the heat output of the heater coil 36 is sufficient to cause the contacts 22 and 20 to remain in engagement for a longer time so that the heating unit 2 will continue to be energized. The continued heat output of the heating unit 2 will cause the temperatures of the vessel 8, sensor plate 12 and the sensor bimetal 14 and the bimetal 16 to rise to 100° F. at which point the increased deflection per degree of temperature rise of the bimetal 14 will finally cause the contacts 20 and 22 to separate. Thereafter the device will cycle at this temperature as previously described.

As indicated the contacts 20 and 22 are initially in engagement with each other. It will be noted however, that the heating coil 36 is energized upon closure of the switch so that the contact 20 is urged toward the contact 22. Thus, such initial engagement of the contacts 20—22 is not essential for the operation of my device as the initial movement of the contact 22 due to heat from coil 36 can establish the electrical circuit for the heater coil 36. If desired in order to insure engagement of the contacts 20—22 over a wide range of ambient temperatures each or both of the bimetals 14 and/or 16 may be bent toward each other after their initial assembly so that a definite initial contact pressure exists therebetween. It of course is to be realized that the device must be calibrated with reference to the initial position of the contacts 20—22 with respect to each other, or with respect to their normal breaking point.

Figure 2:
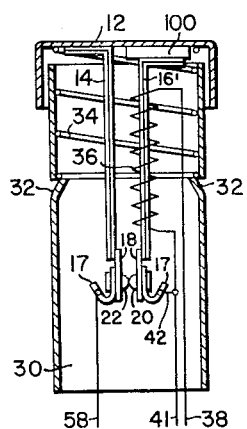
FIG. 2 is a cross sectional view of another control device constructed in accordance with the principles of my invention.
Figure 3:
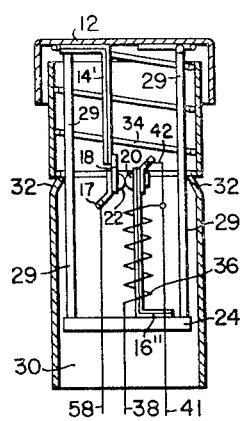
FIG. 3 is a cross sectional view of still another control device constructed in accordance with the principles of my invention.

FIGS. 2 and 3 each illustrate similar control devices, and accordingly, like parts have been given the same reference numerals. Although not shown, it is to be realized that the control circuits for both FIGS. 2 and 3 are identical to that shown in FIG. 1. In the embodiment shown in FIG. 2 a thermal and electrical insulation 100, which may be formed from any suitable material, such as porcelain or silicone compounds is secured between the underside of the sensor plate 12 and a control bimetal 16′ in any suitable manner so that the control bimetal 16′ is both thermally and electrically insulated from the sensor plate 12.

The control bimetal 16′ is similar to the control bimetal 16 previously described, except that the long leg thereof is shortened to compensate for the insertion of the insulator 100 so that the contacts 20—22 will function in the same manner as previously described. In this embodiment of the invention it is obvious that the sensor bimetal 14 functions in the same manner as previously described. The control bimetal 16′ differs in function from the control bimetal 16 in that relatively little heat is received from the sensor plate 12, due to the plate 100, and the heating coil 36 must provide a greater portion of the heat energy to obtain deflections of the control bimetal 16′, than in the previously described embodiment. Due to the high temperatures involved, the ambient temperature of the air mass surrounding the control bimetal 16′ is fairly high and will effect the operation of the control bimetal 16′. Such ambient effect however is considerably less than the temperature effect of securing the control bimetal 16 directly to the sensor plate 12.

In FIG. 2 it will be noted that the contact 20 is secured to the control bimetal 16′ in the same manner as the contact 20 is secured to the control bimetal 16. Since the control bimetal 16′ is electrically insulated from the sensor plate 12 it is not necessary to provide an insulating support 18. Thus if desired the contact 20 may be directly secured to the control bimetal 16′ and in such event the long leg of the control bimetal is elongated to obtain proper coaction between the contacts 20—22. Such a construction is shown in the attachment of the contact 20 to the control bimetal 16″ in FIG. 3. Also, since the control bimetal 16′ is insulated from the sensor plate 12, the heating coil 36 may have its grounded end directly connected to the control bimetal 16′.

Referring to FIG. 3 it will be noted that a sensor bimetal 14′ is provided which is identical to the sensor bimetal 14 previously described in all respects except that its long leg has been shortened so that the contact 22 secured thereto is located closer to the sensor plate 12. An insulating support plate 24 is also provided in spaced relationship below the free end of the sensor plate 12 which has an L-shaped control bimetal 16″ secured thereto so that the free end of its long leg is located adjacent the free end of the sensor bimetal 14′. As indicated the contact 20 is directly secured to the control bimetal 16″ so as to be cooperable with the contact 22 in the same manner as previously described. In order to rigidly locate the support plate 24 below the sensor plate 12, a plurality of upwardly extending tie rods 29 are provided which are rigidly secured in any suitable manner to both the support plate 24 and the underside of the sensor plate 12. The heating coil 36 is again disposed about the control bimetal 16″ to obtain operation thereof in the same manner as previously described. In this embodiment it will be noted that the heating coil 36 functions similarly to the heating coil 36 of FIG. 2; however, as the control bimetal 16″ is further spaced from the sensor plate 12 the ambient temperature effect on the control bimetal 16″ is substantially reduced than in the embodiment of FIG. 2 so that the heating coil 36 of FIG. 3 must provide substantially all the heat energy to obtain the proper deflection of the control bimetal 16″.

It is obvious that the operation of each of the embodiments is substantially identical. The embodiments illustrate, however, that the quantity of heat supplied by the heating coils on the control bimetals may be varied depending upon the amount of heat received by the control bimetals from other sources. As alternatively stated, the control bimetals in my invention may be properly actuated substantially entirely or in part by a variable heat source, the output of which is capable of being controlled and varied by means of a manual adjustment.

Having described preferred embodiments of my invention in accordance with the patent statues, it is desired that the invention be not limited to the specific constructions shown, inasmuch as it is apparent that further modifications thereof such as shown in the previously identified copending application may be made without departing from the broad spirit and scope of my invention.

I claim as my invention:

1. A control device for controlling the temperature of a cooking vessel and its contents by means of controlling a heating unit therefor comprising, a sensor plate having spaced bimetallic members thermally secured thereto, each of said bimetallic members being movable in the same general direction when heated, contacts secured to said bimetallic members, respectively, to be movable into and out of engagement with each other, electrical circuit means electrically connected to each of said contacts for controlling the energization of a heating unit, an electrical resistance heater supported in heat transmitting relation with respect to one of said bimetallic members to cause movement thereof toward the other of said bimetallic members, and said one bimetallic member having a different displacement per degree rise in temperature than the other of said bimetallic members.

2. A control device for controlling the temperature of a cooking vessel and its contents by means of controlling a heating unit therefor comprising, a sensor plate having spaced bimetallic members thermally secured thereto, each of said bimetallic members being movable in the same general direction when heated, contacts secured to said bimetallic members, respectively, to be movable into and out of engagement with each other, electrical circuit means electrically connected to each of said contacts for controlling the energization of a heating unit, an electrical resistance heater supported in heat transmitting relation with respect to one of said bimetallic members to cause movement thereof, and said one bimetallic member having a different displacement per degree rise in temperature than the other of said bimetallic members.

3. A control device for controlling the temperature of a cooking vessel and its contents by means of controlling a heating unit therefor comprising, a sensor plate having spaced bimetallic members thermally secured thereto, each of said bimetallic members being movable in the same general direction when heated, contacts secured to said bimetallic members, respectively, to be movable into and out of engagement with each other, electrical circuit means electrically connected to each of said contacts for controlling the energization of a heating unit, an electrical resistance heater supported in heat transmitting relation with respect to one of said bimetallic members to cause movement thereof toward the other of said bimetallic members, and said one bimetallic member having a smaller displacement per degree rise in temperature than the other of said bimetallic members.

4. A control device for controlling the temperature of a cooking vessel and its contents by means of controlling a heating unit therefor comprising, a thermal conductivity portion having spaced thermally responsive members extending therefrom, each of said thermally responsive members being located to be movable in the same general direction when heated, contacts secured to said thermally responsive members, respectively, to be movable into and out of engagement with each other, electrical circuit means electrically connected to each of said contacts for controlling the energization of a heating unit, an electrical resistance heater supported in heat transmitting relation with respect to one of said thermally responsive members to cause movement thereof toward the other of said thermally responsive members, and said one thermally responsive member having a smaller displacement per degree rise in temperature than the other of said thermally responsive members.

5. A control device for controlling the temperature of a cooking vessel and its contents by means of controlling a heating unit therefor comprising, a pair of elongated bimetallic members each having one end fixedly supported with respect to a thermal conducting portion, at least one of said bimetallic members being thermally secured to said thermal conducting portion, each of said bimetallic members being movable in the same general direction when heated, contacts secured to said bimetallic members respectively, to be movable into and out of engagement with each other, electrical circuit means electrically connected to each of said contacts for controlling energization of a heating unit, an electrical resistance heater supported in heat transmitting relation with respect to one of said bimetallic members to cause movement thereof toward the other of said bimetallic members, and said one bimetallic member having a different displacement per degree rise in temperature than the other of said bimetallic members.

6. A control device for controlling the temperature of a cooking vessel and its contents by means of controlling a heating unit therefor comprising, a pair of elongated bimetallic members each having one end fixedly supported with respect to a thermal conducting portion, at least one of said bimetallic members being thermally secured to said thermal conducting portion, thermal insulating material disposed between the fixed end of the other of said bimetallic members and said conducting portion, each of said bimetallic members being located to be movable in the same general direction when heated, contacts secured to said bimetallic members, respectively, to be movable into and out of engagement with each other, electrical circuit means electrically connected to each of said contacts for controlling the energization of a heating unit, an electrical resistance heater supported in heat transmitting relation with respect to one of said bimetallic members to cause movement thereof toward the other of said bimetallic members, and said one bimetallic member having a different displacement per degree rise in temperature than the other of said bimetallic members.

7. A control device for controlling the temperature of a cooking vessel and its contents by means of controlling a heating unit therefor comprising, a pair of elongated bimetallic members each having one end fixedly supported with respect to a thermal conducting portion, at least one of said bimetallic members being thermally secured to said thermal conducting portion, means for supporting the fixed end of the other of said bimetallic members in spaced relation with respect to said conducting portion, each of said bimetallic members being movable in the same general direction when heated, contacts secured to said bimetallic members, respectively, to be movable into and out of engagement with each other, electrical circuit means electrically connected to each of said contacts for controlling the energization of a heating unit, an electrical resistance heater supported in heat transmitting relation with respect to one of said bimetallic members to cause movement thereof toward the other of said bimetallic members, and said one bimetallic member having a different displacement per degree rise in temperature than the other of said bimetallic members.

8. A control device for controlling the temperature of a cooking vessel and its contents by means of controlling a heating unit therefor comprising, a thermal conducting portion having spaced thermally responsive members extending therefrom which are movable in the same general direction when heated, contacts secured to said thermally responsive members, respectively, to be movable into and out of engagement with each other, electrical circuit means electrically connected to each of the contacts for controlling the energization of a heating unit, an electrical resistance heater supported in heat transmitting relation with respect to one of said thermally responsive members, each of said thermally responsive members having different displacements per degree rise in temperature, and manually adjustable means to selectively energize said resistance heater whereby the movement of said one thermally responsive member may be varied.

9. A control device for controlling the temperature of a cooking vessel and its contents by means of controlling a heating unit therefor comprising, a thermal conducting portion having spaced thermally responsive members extending therefrom which are movable in the same general direction when heated, contacts secured to said thermally responsive members, respectively, to be movable into and out of engagement with each other, electrical circuit means electrically connected to each of contacts for controlling the energization of a heating unit, an electrical resistance heater supported in heat transmitting relation with respect to one of said thermally responsive members to cause movement thereof toward the other of said thermally responsive members, said one thermally responsive member having a smaller displacement per degree rise in temperature than the other of said thermally responsive members, and manually adjustable means to selectively energize said resistance heater whereby the movement of said one thermally responsive member may be varied.

10. A control device for controlling the temperature of a cooking vessel and its contents by means of controlling a heating unit therefor comprising, a sensor plate of heat conducting material to engage the cooking vessel to sense its temperature, a plurality of thermal responsive elements at least one of which is secured in good heat conducting relation to said sensor plate and at least another of which is provided with an auxiliary heater, manually operable means for selectively energizing said auxiliary heater at different energy levels, electrical contacts operated by joint action of said thermal responsive elements in response to temperature changes thereof, and electrical circuit means electrically connected with said contacts for controlling energization of a heating unit.

11. A control device for controlling the temperature of a cooking vessel and its contents by means of controlling a heating unit therefor comprising, a pair of elongated bimetallic members each having one end fixedly supported wth respect to a thermal conducting portion, at least one of said bimetallic members being thermally secured to said thermal conducting portion, each of said bimetallic members being movable in the same general direction when heated, contacts secured to said bimetallic members respectively, to be movable into and out of engagement with each other, electrical circuit means electrically connected to each of said contacts for controlling energization of a heating unit, an electrical resistance heater supported in heat transmitting relation with respect to one of said bimetallic members to cause movement thereof toward the other of said bimetallic members.

12. A control device for controlling temperature of a cooking vessel and its contents by means of controlling a heating unit therefor comprising, a pair of elongated bimetallic members each having one end fixedly supported with respect to a thermal conducting portion, at least one of said bimetallic members being thermally secured to said thermal conducting portion, each of said bimetallic members being movable in the same general direction when heated, contacts secured to said bimetallic members respectively, to be movable into and out of engagement with each other, electrical circuit means electrically connected to each of said contacts for controlling energization of a heating unit, an electrical resistance heater supported in heat transmitting relation with respect to one of said bimetallic members to cause movement thereof with respect to the other of said bimetallic members.

References Cited in the file of this patent

UNITED STATES PATENTS

| | | |
|---|---|---|
| 1,979,471 | Knopp | Nov. 6, 1934 |
| 2,422,526 | Burch | June 17, 1947 |
| 2,427,945 | Clark | Sept. 23, 1947 |
| 2,606,990 | Akeley | Aug. 12, 1952 |
| 2,678,379 | Fry | May 11, 1954 |